United States Patent
Johnson

[15] 3,640,846
[45] Feb. 8, 1972

[54] PRODUCTION OF METHANE BY BACTERIAL ACTION

[72] Inventor: Glenn E. Johnson, Pittsburgh, Pa.

[73] Assignee: The United States of America as represented by the Secretary of the Interior

[22] Filed: Apr. 29, 1969

[21] Appl. No.: 820,328

[52] U.S. Cl. ............................. 195/27, 195/104, 195/28 R, 48/210, 48/197 A, 48/209, 210/2
[51] Int. Cl. ......................................... C12d 3/10, C02c 1/14
[58] Field of Search ................. 195/27, 28, 104, 33; 210/1, 210/2; 48/197 A, 209, 111, 210; 23/259.1

[56] References Cited

UNITED STATES PATENTS 1,990,523  2/1935  Buswell et al. ............................ 195/33

OTHER PUBLICATIONS

Davis, J. B., Petroleum Microbiology, pp 185–186 9/14/67

Nelson et al., Journal of Agricultural Research", Vol 58, No. 4, 2/15/39 p. 273

Primary Examiner—Joseph M. Golian
Attorney—Ernest S. Cohen and M. Howard Silverstein

[57] ABSTRACT

A mixture of coal and sewage solids is digested by anaerobic bacteria to produce methane.

1 Claims, No Drawings

PRODUCTION OF METHANE BY BACTERIAL ACTION

This invention relates to producing methane from coal and sewage solids.

Most methane used today is obtained from the earth by means of gas wells. In some areas and for specific uses, however, methane is manufactured by conventional gasmaking processes from both liquid and solid fuels. The sources of natural gas are limited and the gas is becoming more costly to recover as deeper wells are of necessity being drilled in more inaccessible locations. As a result, the demand for manufactured gas is increasing.

Heretofore, methane has been manufactured by coal carbonization techniques such as the Lurgi process and the carbureted water gas reaction, and by the reforming of liquid fuels such as naphtha. Methane has also been produced, on a smaller scale, during the digestion of sewage by anaerobic bacteria.

We have now discovered that a mixture of sewage and coal substantially increases the production of methane by anaerobic digestion.

It is therefore an object of the present invention to produce methane through anaerobic digestion. Another object is to employ anaerobic bacteria to produce methane from coal. A further object is to increase the production of methane from sewage digestion by the addition of coal. A still further object is to provide additional sewage gas to operate the engines in those sewage disposal plants which utilize sewage gas-burning engines.

In the practice of the invention a sewage sludge containing methane-producing anaerobic bacteria is admixed with particulate coal in a vessel from which air is excluded. Since sewage solids decomposition for methane production is best attained at about 95°–100° F., the vessel is preferably maintained at this temperature, although a wider temperature range (e.g., about 50°–150° F.) can be employed. Any methane-producing anaerobic bacteria heretofore employed to produce methane from sewage can be employed in the practice of the present invention. A discussion of such digestion appears in "Biological Waste Treatment" by W. W. Eckenfelder, Jr. and D. J. O'Connor, MacMillan Co., N.Y. 1961, pages 248–269. Exemplary bacteria suitable for the purposes of the present invention are found in the genera Methanobacterium, Methanococcus and Methanosarcina. Suitable coal-to-sludge weight ratios are about 1:100 to about 1:2. Generally, there is no limitation as to the maximum amount of coal that can be added.

Although round-shaped tanks are usually employed to produce methane from sewage sludge, the present operation is also readily carried out in rectangular or oblong vessels, either horizontally or vertically disposed, through which the coal and sludge are concurrently fed.

The lower ranking coals such as lignite and subbituminous A, B and C are preferably employed because they contain more celluloselike material upon which the bacteria may feed. However, higher ranking coals such as low volatile bituminous (LVB) and high volatile A bituminous (HVAB) can be employed. Whatever coal is employed, at the termination of gas production the residual coal can be employed as fuel. A coal particle size of about −60 mesh is suitable although finer particulate coal (e.g., −325 mesh) is preferred since more coal surface is exposed.

The following examples illustrate the effect of coal on anaerobic digestion.

EXAMPLE 1

Three 2,000 ml. samples of activated sewage sludge which contained anaerobic methane-producing organisms were placed in separate glass flasks, from which air had previously been flushed from each flask system with an inert gas (helium or nitrogen). To one of the flasks was added an individual 100 gram sample of LVB coal (−325 mesh); to another, 100 grams of HVAB (−325 mesh) coal was added. The third flask contained no coal. The contents of each flask was slowly stirred. The product gas produced during digestion (at 95°–100° F.) in each flask was periodically quantitatively and qualitatively analyzed. The results were as follows:

TABLE I

| | Test results with sludge only | | | Test results with LVB coal | | | Test results with HVAB coal | | |
|---|---|---|---|---|---|---|---|---|---|
| | Gas analysis, vol. percent | | Cumulative gas volume, liters | Gas analysis, vol. percent | | Cumulative gas volume, liters | Gas analysis, vol. percent | | Cumulative gas volume, liters |
| Hours of operation | Methane | Carbon dioxide | | Methane | Carbon dioxide | | Methane | Carbon dioxide | |
| 300 | | | | 82 | 18 | 3.9 | | | |
| 400 | 77 | 23 | 2.4 | 84 | 16 | 7.3 | 72 | 28 | 2.5 |
| 600 | | | | 87 | 13 | 12.8 | 83 | 17 | 6.5 |
| 650 | 82 | 18 | 4.5 | 83 | 17 | 13.5 | 78 | 22 | 7.2 |
| 800 | | | | 86 | 14 | 14.6 | 80 | 20 | 11.0 |
| 1,100 | 79 | 21 | 5.7 | | | | | | |
| 1,300 | 82 | 18 | 7.7 | 87 | 13 | 15.7 | 83 | 17 | 12.6 |

EXAMPLE 2

Two 2,000 ml. samples of activated sewage sludge which contained anaerobic methane-producing organisms were placed in separate glass flasks from which air had previously been flushed with an inert gas (helium or nitrogen). Initially, no coal was added to either flask. Lignite was later added to both flasks at the times shown below. The contents of each flask were slowly stirred. The product gas produced during digestion (at 95°–100° F.) in each flask was periodically quantitatively and qualitatively analyzed. The results were as follows:

TABLE 2

| | Test A | | | Test B | | |
|---|---|---|---|---|---|---|
| | Gas analysis, volume percent | | Cumulative gas volume, liters | Gas analysis, volume percent | | Cumulative gas volume, liters |
| Hours of operation | Methane | $CO_2$ | | Methane | $CO_2$ | |
| 100 | 28 | 72 | [1] 0.6 | | | 0.8 |
| 200 | 44 | 56 | 1.3 | 88 | 12 | 1.6 |
| 250 | 52 | 48 | 2.2 | 90 | 10 | 2.6 |
| 325 | 70 | 30 | 3.2 | 95 | 5 | 3.5 |
| 400 | 74 | 26 | 4.0 | 95 | 5 | 4.1 |
| 500 | 74 | 26 | 5.3 | 95 | 5 | 4.5 |
| 750 | 78 | 22 | [1] 6.3 | | | 4.8 |
| 900 | 69 | 31 | 7.8 | | | [2] 4.9 |
| 1,030 | 56 | 44 | [1] 8.4 | 91 | 10 | 5.4 |
| 1,100 | | | 8.6 | | | 5.5 |

[1] 200 g. lignite (−325 mesh) added in test A at the end of 100 hours, 750 hours and 1,030 hours.
[2] Gas production in test B ceased after 900 hours; 100 g. lignite (−325 mesh) added at the end of 900 hours which reinitiated gas production within minutes.

EXAMPLE 3

3,000 ml. of sewage sludge which contained anaerobic bacteria was placed in an air-free flask at 95°–100° F. Product gas was periodically quantitatively and qualitatively analyzed. After 365 hours when gas production ceased, 250 grams of powdered lignite were added to the flask. The product gas was again qualitatively and quantitatively analyzed.

The results were as follows:

TABLE 3

| Digestion time hour | Gas Analysis, Volume % | | Cumulative Gas Volume liters |
|---|---|---|---|
| | Methane | Carbon Dioxide | |
| 25 | 60 | 40 | 0.7 |
| 100 | 72 | 28 | 1.3 |
| 150 | 78 | 22 | 3.0 |
| 200 | 80 | 20 | 4.2 |
| 250 | 85 | 15 | 5.5 |
| 350[1] | 68 | 33 | 6.0 |
| 500 | 55 | 45 | 6.5 |
| 700 | 67 | 33 | 7.1 |
| 800 | 76 | 24 | 7.8 |
| 1000 | 95 | 5 | 8.4 |
| 1440 | 91 | 9 | 8.9 |

[1]Gas production ceased after 365 hours; 250 grams of lignite (− 325 mesh) was then added reinitiating gas production.

As can be seen from Table 1, the addition of coal has a pronounced effect on total gas production. The LVB coal more than doubled gas production while the HVAB coal almost achieved the same result. Table 2 shows that lignite also has a similar effect. Tables 2 and 3 both show that the addition of coal at a point where gas production has ceased will substantially reactivate such production.

At sewage facilities internal combustion engines are generally used to drive auxiliary equipment such as sewage pumps or blowers which provide air for the aeration tanks, etc. Heretofore, the generation of sewage gas ($CO_2+CH_4$) at such facilities has generally been insufficient to completely operate those engines on sewage gas, and the fuel has to be supplemented with natural gas. The present invention provides a method of generating sufficient gas at such facilities to completely fuel all these auxiliary engines.

An additional benefit of the present invention is that coal which has been previously used elsewhere in a sewage treatment system as, for example, an adsorbent, settling agent, filter aid, filtration agent or the like, can be reused in the present digestion process to generate gas.

Since coal provides improved methane gas production from sewage digestion, strains of bacteria could probably be developed which feed on coal alone. Such bacteria could then be injected in water which, when flooded into worked-out coal mines, would feed upon coal refuse left underground, and result in methane production.

What is claimed is:
1. A process for producing methane by the anaerobic digestion of sewage sludge consisting essentially of anaerobically digesting sewage sludge to produce methane; adding coal to said sludge during said digestion step, wherein the coal-sludge ratio is 100 grams of coal per 2,000 ml. of said sludge, wherein the temperature during digestion is about 95°–100° F.; and wherein said coal is selected from the group consisting of lignite, subbituminous, and bituminous.

* * * * *